Sept. 6, 1927.  J. M. RUSSELL  1,641,604
SOLDER IRON
Filed March 18, 1924
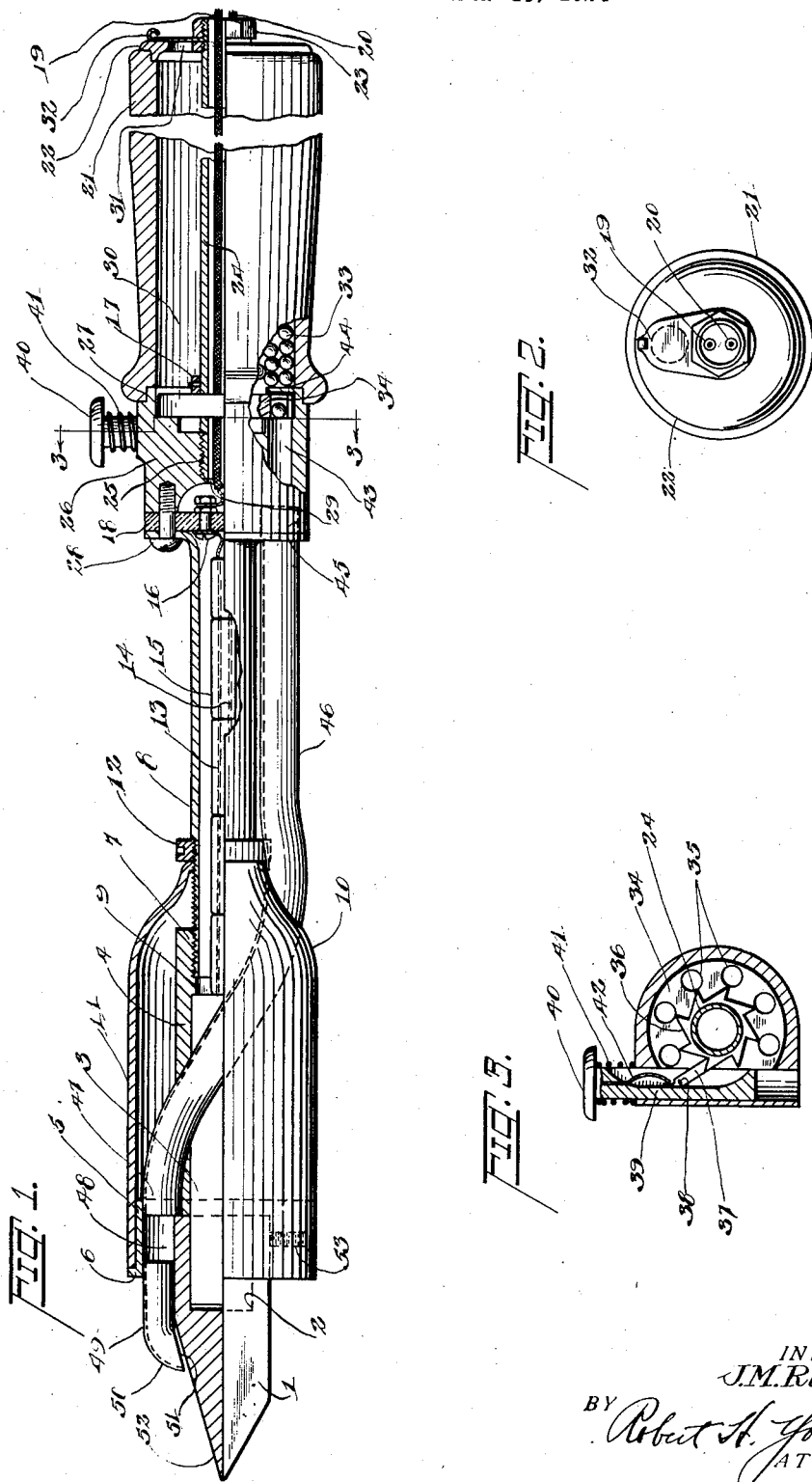
INVENTOR
J. M. Russell
BY Robert A. Young
ATTORNEY Patented Sept. 6, 1927.

1,641,604

UNITED STATES PATENT OFFICE.

JAMES M. RUSSELL, OF DAYTON, OHIO.

SOLDER IRON.

Application filed March 18, 1924. Serial No. 700,099.

This invention relates to soldering irons, and has for its principal object the provision of means for feeding solder pellets which are contained in a storage chamber to the solder tip or end of the iron.

A second object is the provision of a chamber for the storage of solder in the interior of the handle of the iron. It is a further object of my invention to provide a heat-insulating chamber of dead air at the rear of that part of the iron adjacent to the heating element.

A further object is the provision of solder in pellet form in which each pellet is of a size to provide a single drop of solder when in a molten form.

Other objects and advantages will be more fully set forth in the attached specification and claims, and in the drawings, in which:
Fig. 1 is a part sectional view of my improved soldering iron.

Fig. 2 is an end view of the handle, and

Fig. 3 is a section on the line 3—3 of Fig. 1.

A soldering tip of suitable pyramidal form is shown at 1 preferably formed of copper and is provided with a rear inner bore 2 within which the end of a suitable electric heating element 3 extends. Slidingly fitted on the rear end of this soldering tip is a heat conducting part of preferably brass formed of an elongated hollow cylinder 4 which entirely surrounds the rear end of the heating element and a forward flanged part 5 which loosely receives the rear end of the soldering tip and which is provided with a forward flange 6. The rear end of the heat conducting part 4 is provided with internal threads 7 within which a pipe or shank 8 is threaded.
An inner flange 9 provides a stop for the threaded pipe 8 and also serves as an end stop for the heating element within the heat conducting part 4.

Slidingly fitted over the threads of the pipe 8 is a sleeve 10 having a contracted rear opening for the reception of the pipe 8 and a forward cylindrical part 11 which slides over the part 5 and abuts against the flange 6. A lock nut 12 is threaded on the pipe 8 and serves to hold the sleeve 10 in position.

This sleeve confines a quantity of air therein so as to provide a dead air chamber immediately surrounding the rear end of the heat-conducting part 4 and the heating element contained therein so as to prevent the undue dissipation of heat from the soldering iron at any point except from the forward end or soldering tip where the heat may be utilized in the process of soldering.

The heating element 3 is provided with terminals or wires 13 and 14 on which are threaded insulators 15 to prevent the contacting of the wires with the enclosing pipe 8. The ends of these wires 13 and 14 are connected by means of small terminal bolts 16 to an insulating block 18. The rear end of the pipe 8 is outwardly flanged and abuts against the forward face of the insulating block 18. At the rear face of the insulator block the electrical supply wires 19 and 20 are connected to the same terminal bolts 16; these wires 19 and 20 extending rearwardly through the center of the handle which is shown as formed of a hollow wooden hand piece 21 having an end closure cap 22 which is held in place by means of a nut 23 threaded on a pipe 24 within which the terminal wires 19 and 20 are carried. The forward end of this pipe is provided with external threads 25 which are threaded into a block 26, this block being provided with a flange 27 adapted to slidingly engage the forward end of the hand piece 21. It will thus be seen that the block 26 is held firmly against the hand piece 21 by means of the threaded piece 24, the nut 23, and the end cap 22, but that the entire handle may be readily disassembled by merely unscrewing the nut 23.

The block 26 abuts at its forward end against the insulator block 18 and a plurality of assembly screws 28 hold the pipe 8, insulator part 18, and block 26 together. The wires 19 and 20 extend through an opening 29 and when the assembly screws 28 are removed, the entire handle consisting of the block 26 and the hand piece 21 and the parts contained therein may be moved rearwardly and slide over the wires 19 and 20 so that these wires may be disengaged at their ends from the terminal bolt 16. It will be seen therefore that the insulator block provides an electrically insulated part for the attachment of the electrical connections and serves as an assembly block for attaching and insulating the handle and the soldering end.

The hand piece 21 being hollow provides an interior chamber 30 which is adapted to contain a quantity of solder pellets. These pellets are formed of rounded spheres of solder, each pellet containing a sufficient quantity of solder so as to provide one drop when melted, or in a molten state. These pellets are admitted through an opening 31 in the end cap 22, a closure 32 being adapted to rotate upon the pipe 24 and held in frictional engagement with the end cap by means of the end nut 23.

The solder pellets which are indicated at 33 are adapted to be released by a valve mechanism so that they may be fed to the soldering end by means of a conducting passage. This valve mechanism consists of a cylindrical valve block 34 which is provided with a plurality of small holes 35, each of which is adapted to neatly contain therein one of the soldering pellets. The valve block is mounted so as to be loosely rotatable upon the pipe 24 and is held against lengthwise movement therein by washer 17 pinned to this pipe, and is adapted to be rotated thereon a step at a time by means of a toothed wheel 36 fixed to the valve block 34 or formed as an integral part thereof. The wheel is adapted to be rotated by means of a pawl 37 pivotally held by means of a pin 38 in a manually operated plunger 39 which is provided with a knob 40. A spring 41 normally holds the plunger in the position shown in Fig. 3. A suitable spring 42 normally maintains the pawl so as to engage successive teeth in the wheel 36.

A cylindrical bore or passage 43 is provided in the lower part of the block 26 and the cylindrical chambers 35 in the valve block are adapted to register one at a time with this passage 43. The rear face of the valve block 34 is exposed to the solder pellets so that they may find a place in the holes 35 as the valve block is rotated so that by the time a chamber 35 is in alignment with the passage 43 it will be practically assured that the chamber 35 contains one of the soldering pellets. A small projection 44 is provided on the block 26 so as to close the rear opening of the chambers 35 at the time they are in engagement or alignment with the passage 43. It will thus be assured that only one of the soldering pellets will be released at a time.

Fitted within a hole in the flange of the shank 8 and also within the insulator block 18 is the end 45 of a pipe 46 so that the end of the pipe is in alignment with the passage 43 and the block 26. Pipe 46 extends forwardly and enters the sleeve 10 at a point near and to the bottom of the same. Pipe 46 then extends spirally around inside of the sleeve 10 in the dead air chamber therein, and externally of the heat conducting part 4. The forward end 47 of the pipe 46 extends within an aperture in the flange 5 of the heat conducting part. A hole 48 is provided in the upper end of the flange 5 in alignment with the end of the pipe 47 and a small portion of pipe 49 is slidingly fitted within the end of the hole 48 so that it may be adjusted within the hold 49 to be adapted to various lengths of soldering tips. The forward end of this pipe 49 is closed as shown at 50, an opening 51 however being provided at that portion of the end of the pipe adjacent to the surface 52 of the soldering end. This surface may be either the upper surface when held in a normal manner or may be a vertical or angularly extending side surface. In either case the solder will travel from the surface at which it is supplied, to the tip of the solder end, and to a lower surface of the soldering end.

After the entire device has been assembled, a set screw 53 is provided so as to hold the soldering tip or end 1 within the flange 5 of the heat conducting part, providing an easy means for disassembling or for the substitution of larger or smaller soldering ends or those having different shapes.

It will be understood that when the soldering iron is held in a downwardly inclined position and assuming that the electric current has been supplied to the heating element, and that solder pellets are contained in the handle of the iron, these solder pellets may be successively fed through the tubular passage by pressing upon the knob 40. If then the knob is pressed, a pellet is released and travels due to the force of gravity through the tubular passage to the point where this passage enters the dead air chamber. At this point the pellet begins to absorb heat slowly at first and then more rapidly as it approaches the hotter parts of the iron until it has reached the end of the tube 49 and just before it touches the soldering end 1. At this point the solder is quite warm but is still in a solid condition. As soon as the pellet touches the surface 53 of the soldering end, it is liquefied by the heat supplied from that surface. The melted portions immediately flow downwardly over the surface 52, such action being permitted by a small space between the end 51 of the pipe and the surface 52. This space however is sufficiently small so as to prevent the release of a pellet before it has been liquefied. The solder may be supplied as rapidly as desired to the heating end and if so desired may be supplied with any suitable flux while stored in the chamber 30 or during their travel through the tubular passage.

I claim:—

1. A soldering iron comprising in combination a soldering end, a heating device therefor, a handle, a chamber formed therein for the storage of solid solder pellets and a closable opening in the end of the chamber for the supply of solder to the chamber.

2. A soldering iron comprising a soldering tip, a heating element, a heat conducting member abutting said tip, said tip and said member enclosing said element, a sleeve spaced from and providing an insulating chamber around said member, a handle, a chamber therein for the reception of solder pellets, a releasing means for the pellets at the end of the handle, a shank connecting said member to said handle, and a tube extending from the releasing means to a point adjacent a surface of the tip, said tube extending through said sleeve.

3. A soldering iron comprising in combination, a removable soldering tip, a heating element therefor, a handle having a chamber for the reception of a quantity of solder pellets, a heat insulator between the handle and the soldering element, an insulating chamber surrounding the rear of the element and defined by a sleeve spaced from the heating element, means for releasing the pellets from the chamber and a conducting tube extending from said releasing means through the insulating chamber to a point adjacent the soldering tip.

4. A soldering iron, a solder reservoir, a soldering end, a heating means for the soldering end, a casing about said heating means forming a heat insulating chamber about said heating means and a solder conducting means from said reservoir to said soldering end and having a portion thereof passing through said heat insulating chamber.

In testimony whereof I affix my signature.

JAMES M. RUSSELL.